Oct. 26, 1971     H. H. STERNHAGEN     3,615,158
TRACTOR-WAGON HITCH GUIDE
Filed July 30, 1969

INVENTOR.
HARLAND H. STERNHAGEN
BY Joseph G. Werner
James A. Kemmeter
ATTORNEY

United States Patent Office 3,615,158
Patented Oct. 26, 1971

3,615,158
TRACTOR-WAGON HITCH GUIDE
Harland H. Sternhagen, Box 184, Rte. 2,
Westfield, Wis. 53964
Filed July 30, 1969, Ser. No. 845,963
Int. Cl. B60d *1/00*
U.S. Cl. 280—477                                    1 Claim

ABSTRACT OF THE DISCLOSURE

A tractor-wagon hitch guide that allows a single operator to accurately align the tractor towbar and wagon tongue to facilitate connecting. The guide includes a connecting member pivotally mounted on the tongue or draw bar of the wagon or other implement to be towed and an arcuate bar or rod connected to and extending upwardly from the member mounted on the tongue or draw bar, the arc of said rod having a radius equal to the distance between the pivot point of said wagon tongue and the engaging portion of the hitch member attached on said tongue.

BACKGROUND OF THE INVENTION

(1) Field of the invention

This invention relates to guides to be used primarily by operators of farm tractors to enable a single operator to accurately align the tractor towbar and the draw bar or tongue of a wagon or implement to be connected to and drawn by the tractor so that when the tongue or draw bar is lifted to the towbar, the connecting-pin holes will be aligned.

(2) Description of the prior art

Guides and sights to aid in lining up the connecting members of auto-trailer hitches and the like have appeared in many varieties. They have most often been used in connection with the ball trailer hitch wherein the ball part of the hitch is mounted on the rear of a vehicle and the socket part of the hitch is mounted on the trailer to be towed. The guides or sights used in lining up this type of hitch all employ two sight members, one mounted on the towing vehicle and the other mounted on towed vehicle. In addition, they depend upon the tongue of the trailer or towed vehicle being held in a substantially horizontal position by a support member so that the ball on the towing vehicle is essentially backed to a position directly under the hitch socket on the towed vehicle. Thus, such guides employ a support for the tongue of the towed vehicle to hold the tongue in a raised position just slightly higher than the ball on the towing vehicle, and two guide or sighting members are required.

SUMMARY OF THE INVENTION

Generally, my invention comprises a guide wherein it is not necessary to support the tongue of the towed vehicle above the ground and only one guide member is needed. When the tongue of the towed vehicle is lifted to the level of the towbar on the towing vehicle and swung into the mating position, the hitch member on the towed vehicle will be in proper alignment with the hitch member on the towing vehicle.

This is accomplished by an arcuate bar or rod that is connected to the tongue of the towed vehicle, the rod or bar having an arc that coincides with the path that the hitch member mounted on the tongue of the towed vehicle follows as it is swung from a resting position on the ground to the position mating it with the hitch member mounted on the towing vehicle.

DESCRIPTION OF THE PREFERRED EMBODIMENTS

Figure 1:
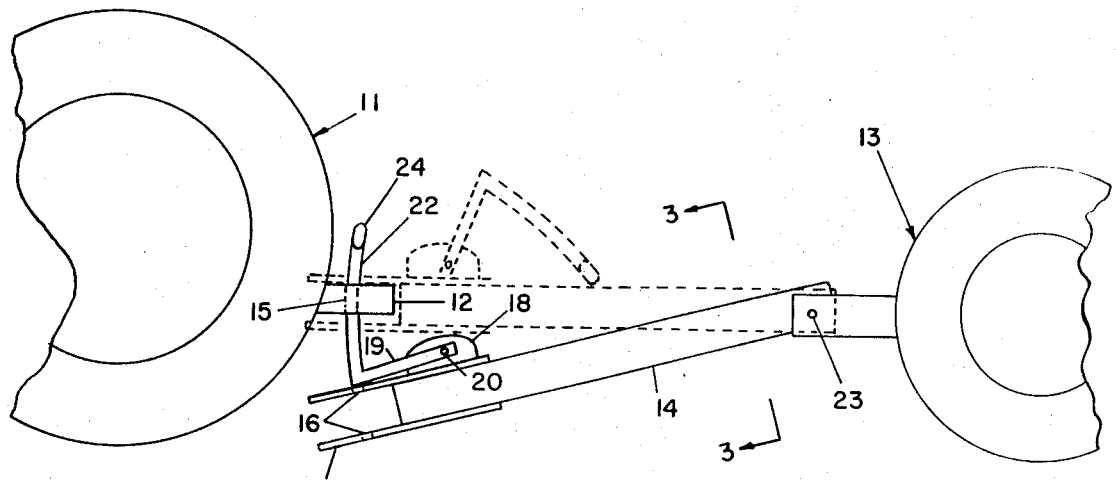
FIG. 1 is a fragmentary side view showing a rear portion of a towing vehicle and a front portion of a towed vehicle with my invention mounted on the hitch member of the tongue of the towed vehicle.

More specifically, referring to FIG. 1, a tractor 11 with towbar 12 mounted on it is shown with a wagon 13 having a tongue or draw bar 14. Towbar 12 and tongue 14 are shown by the full lines of FIG. 1 in spaced relationship as they would be prior to lifting the tongue 14 up and swinging it into place with the towbar 12. Because a loaded wagon or other implement to be towed is too heavy to move by hand, the hole 15 in the towbar 12 and holes 16 in the hitch 17 attached to tongue 14 must be in proper alignment when the tongue 14 and hitch 17 are lifted and swung into place around towbar 12 as shown by the dotted lines in FIG. 1.

Such proper alignment is accomplished by my invention which embodies a simple guide mechanism mounted on the tongue of the vehicle to be towed. Attaching member 18 is welded on or otherwise fixedly attached to hitch 17. A support member 19 is pivotally attached on attaching member 18 by bolt 20 and nut 21. Attached on support member 19 is an arcuate rod 22 which serves as the visual guide of my hitching aid and which will be more fully explained later. Support member 19 functions as both a support for rod 22 when said rod is in its substantially upright sighting position and as an automatic stopper to prevent the forwardly rotation of support member 19 and rod 22 beyond its upright working position. To accomplish this, attaching member 18 is mounted on one side of hitch 17 and tongue 14, and support member 19 is attached on the side of attaching member 18 that is nearest to the hitch 17 and tongue 14. Thereby, when support member 19 and rod 22 are pivoted forwardly about bolt 20 support member 19 comes to rest on the upper surface of hitch 17, forward rotation thereby being stopped, and rod 22 is in its substantially upright sighting position, as shown by the solid lines in FIG. 1.

Arcuate rod 22 is welded or otherwise fixedly attached to support member 19. It is noted that rod 22 is not a straight rod, but is curved in an arc. The arc has a radius equal to the distance along the length of the tongue 14 between the point where the tongue is pivotally attached to wagon 13 at point 23 and the engaging portion, illustrated here as holes 16, of hitch 17. Rod 22 then is a physical representation of the path that the holes 16 in hitch 17 will follow as tongue 14 is raised to its substantially horizontal hitching position, represented by dotted lines in FIG. 1, by vertically pivoting tongue 14 about point 23, since rod 22 has an arc of a radius equal to the distance between pivot point 23 and holes 16.

Rod 22 is mounted on hitch 17 so that it is at one of the vertical sides of tongue 14. In the illustrations, it is shown mounted on the left side of hitch 17 when viewed from the position of a tractor operator backing toward the wagon so as to look at the wagon from the hitch end of the tongue, but it can be mounted to either side of the tongue. To align hole 15 of draw bar 12 and holes 16 of tongue 14, even though tongue 14 is resting on the ground at the hitch 17 end, the operator backs tractor 11 to a position wherein draw bar 12 is alongside rod 22 such that rod 22, at the point where it is adjacent to tow bar 12, is laterally aligned with hole 15 of draw bar 12.

Figure 2:
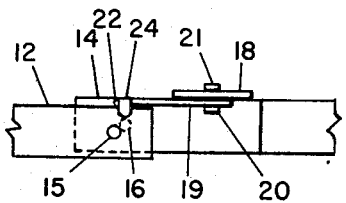
FIG. 2 is a fragmentary top view of the towing vehicle and towed vehicle with my invention mounted on the hitch member of the tongue of the towed vehicle.
Figure 3:
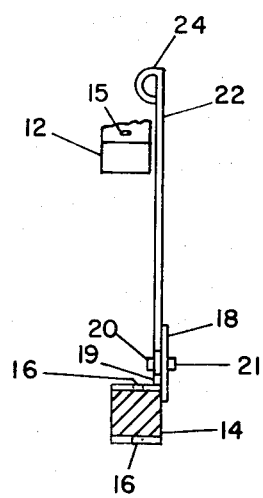
FIG. 3 is a sectional view taken substantially on the line 3—3 of FIG. 1.

With reference to right and left directions always from the view of a tractor operator looking to the rear while backing tractor 11 toward the hitch end of wagon 13, the left side of tow bar 12 is brought alongside rod 22 so that rod 22 is lateral to hole 15. Referring to FIGS. 2 and 3 then, it is seen that tongue 14 is vertically under draw bar 12 and holes 16 of hitch 17 and hole 15 of tow bar 12 are not aligned when tongue 14 is resting on the ground. However, tongue 14 and tow bar 12 are in proper position for hitching and when tongue 14 is raised to its substantially horizontal hitching position and swung into its mating position with tow bar 12, holes 16 and hole 15 will then be aligned and the connecting pin or bolt can be placed through the holes, and the tractor 11 and wagon 13 will be hitched.

A loop 24 has been made in rod 22 so that, when the guide is not being used, rod 22 and flat-iron 19 can be rotated toward the wagon to a rest position as shown by the dotted outline of rod 22 and support member 19 in FIG. 1, and loop 24 serves as a stopper against tongue 14 to prevent the rod from rotating below the tongue. Thus, rod 22 will not be dragged along the ground where it can catch on objects and be bent out of its proper shape. Also the loop 24 serves as a safety feature so that there is not any pointed end of rod 22 which might injure anyone leaning or falling against it.

It is thus apparent that my invention will work with any wagon or any farm implement that have any length tongues or towing bars so long as the arc of the sighting rod 22 has a radius equal to the length between the pivot point of the tongue and the engaging portion of the hitch mounted to said tongue.

I claim:
1. In combination with the tongue of a vehicle to be towed, one end of said tongue being pivotally attached to said vehicle and the other end of said tongue having a hitch member mounted thereon, said hitch member having a pin receiving aperture therein, a hitching guide comprising:
 (a) an attaching member fixedly mounted on said hitch member,
 (b) an arcuate rod
 (c) a support member pivotally attached to and laterally disposed from said attaching member for pivoting said rod between a substantially upright sighting position and a rest position, said support member engaging the upper surface of said hitch member to maintain said rod in said substantially upright sighting position,
 (d) said arcuate rod having an upper and a lower end fixedly attached at its lower end to said support member in substantial lateral alignment with said pin receiving aperture, the arc of said rod having a radius equal to the distance along said tongue between the point where it is pivotally attached to said vehicle and said pin receiving aperture in said hitch member, and
 (e) means on the upper end of said arcuate rod to engage the upper surface of the tongue of the vehicle when said arcuate rod and support member are rotated to said rest position.

References Cited

UNITED STATES PATENTS

| 1,807,379 | 5/1931 | Burrows | 280—477 |
| 2,459,245 | 1/1949 | Seward | 280—515 |
| 2,769,646 | 11/1956 | Omon et al. | 280—477 X |

FOREIGN PATENTS

| 454,366 | 7/1950 | Italy | 280—477 |

BENJAMIN HERSH, Primary Examiner

J. P. SILVERSTRIM, Assistant Examiner

U.S. Cl. X.R.

33—185.5